US012749190B2

(12) United States Patent
Ghyselinck et al.

(10) Patent No.: US 12,749,190 B2

(45) Date of Patent: Sep. 29, 2026

(54) METHOD FOR CHARACTERIZING AN INTRAORAL ORGAN

(71) Applicant: DENTAL MONITORING, Paris (FR)

(72) Inventors: Guillaume Ghyselinck, Cantin (FR); Thomas Pellissard, Maisons-Alfort (FR); Laurent Andres, Lansargues (FR)

(73) Assignee: DENTAL MONITORING, Paris (FR)

( * ) Notice: Subject to any disclaimer, the term of this patent is extended or adjusted under 35 U.S.C. 154(b) by 398 days.

(21) Appl. No.: 18/270,999

(22) PCT Filed: Jan. 11, 2022

(86) PCT No.: PCT/EP2022/050461

§ 371 (c)(1),
(2) Date: Jul. 5, 2023

(87) PCT Pub. No.: WO2022/152706

PCT Pub. Date: Jul. 21, 2022

(65) Prior Publication Data

US 2024/0062379 A1 Feb. 22, 2024

(30) Foreign Application Priority Data

Jan. 12, 2021 (FR) ....................................... 2100244

(51) Int. Cl.
*G06T 7/00* (2017.01)
*G06T 7/33* (2017.01)

(52) U.S. Cl.
CPC ............ *G06T 7/0014* (2013.01); *G06T 7/344* (2017.01); *G06T 2200/04* (2013.01); *G06T 2207/30036* (2013.01)

(58) Field of Classification Search
CPC ... G06T 7/0014; G06T 7/344; G06T 2200/04; G06T 2207/30036; G06T 7/30;
(Continued)

(56) References Cited

U.S. PATENT DOCUMENTS

| | | | | |
|---|---|---|---|---|
| 8,439,672 B2 * | 5/2013 | Matov | .................... | A61C 7/146 433/24 |
| 10,304,190 B2 * | 5/2019 | Alvarez | .................... | G06T 7/74 |

(Continued)

FOREIGN PATENT DOCUMENTS

| | | |
|---|---|---|
| CN | 106170705 A | 11/2016 |
| CN | 108629838 A | 10/2018 |

(Continued)

OTHER PUBLICATIONS

Tian ma et al. "A Survey of Three-dimensional Reconstruction Methods for Tooth Models", Dec. 2018, IEEE (Year: 2018).*

(Continued)

*Primary Examiner* — John Villecco
*Assistant Examiner* — Alejandro Hernandez
(74) *Attorney, Agent, or Firm* — Ronald M. Kachmarik; Cooper Legal Group LLC

(57) ABSTRACT

A method for characterizing an intraoral organ. Modelling the organ as a digital three-dimensional model to be characterized (MTBC), including a mesh of points defining a surface. Placing the MTBC in a standardized configuration with respect to a digital three-dimensional initial reference model (IRM), including a mesh of points, called initial reference points (IRPs), the number of IRPs being less than 20% of the MTBC. Then, determining a final reference point (FRP), for each IRP, by a deformation algorithm. Then, determining a set of values determining the position of the FRP and/or a final elementary surface depending on the FRP, the algorithm determining the positions of the FRPs so that a final reference model consisting of a mesh of the final reference points matches the model to be characterized as closely as possible. Generating a characteristic vector grouping, in an ordered manner, the values determined for all the IRPs.

22 Claims, 3 Drawing Sheets

(58) Field of Classification Search
CPC ....... G06T 17/00; G06T 17/20; G06T 7/0012; G06T 7/11; G06T 19/20; A61C 7/002; A61C 13/00; A61C 13/34; A61C 13/0004; A61C 9/0053; A61C 9/0046
See application file for complete search history.

(56) References Cited

U.S. PATENT DOCUMENTS

| | | | | |
|---|---|---|---|---|
| 10,559,111 | B2 * | 2/2020 | Sachs | G06F 18/23 |
| 10,603,136 | B2 * | 3/2020 | Kopelman | G06T 19/20 |
| 11,270,523 | B2 * | 3/2022 | Long | A61B 5/7435 |
| 11,654,001 | B2 * | 5/2023 | Roschin | A61C 9/0053 433/214 |
| 12,400,754 | B2 * | 8/2025 | Farkash | A61C 9/0053 |
| 2009/0191503 | A1 * | 7/2009 | Matov | A61C 7/08 433/2 |
| 2012/0114223 | A1 * | 5/2012 | Luisi | G06T 19/00 382/154 |
| 2013/0070995 | A1 * | 3/2013 | Chou | G06T 7/344 382/128 |
| 2018/0318051 | A1 * | 11/2018 | Lu | G06T 5/70 |
| 2019/0108679 | A1 * | 4/2019 | Wang | G06T 7/344 |
| 2019/0122411 | A1 * | 4/2019 | Sachs | G06T 7/90 |
| 2020/0107915 | A1 * | 4/2020 | Roschin | A61C 13/34 |
| 2022/0215625 | A1 * | 7/2022 | Xia | A61B 6/501 |
| 2022/0292776 | A1 * | 9/2022 | Liu | G06T 17/205 |
| 2022/0358740 | A1 * | 11/2022 | Ezhov | G06T 19/20 |
| 2023/0149083 | A1 * | 5/2023 | Lin | G06T 7/0014 606/130 |
| 2024/0046593 | A1 * | 2/2024 | Cascetta | G06T 7/70 |
| 2025/0009483 | A1 * | 1/2025 | Ezhov | A61C 9/0053 |
| 2025/0200894 | A1 * | 6/2025 | Peter | G06T 13/40 |
| 2025/0262034 | A1 * | 8/2025 | Saphier | G06T 17/00 |
| 2025/0384632 | A1 * | 12/2025 | Moshe | G06T 5/50 |

FOREIGN PATENT DOCUMENTS

| | | | | |
|---|---|---|---|---|
| CN | 108491850 | B | 4/2020 | |
| JP | 2022516488 | A * | 2/2022 | G06T 7/344 |
| WO | 2016066651 | A1 | 5/2016 | |
| WO | 2018005071 | A1 | 1/2018 | |
| WO | 2019149697 | A1 | 8/2019 | |
| WO | 2019149700 | A1 | 8/2019 | |
| WO | 2020005386 | A1 | 1/2020 | |
| WO | 2020206135 | A1 | 10/2020 | |

OTHER PUBLICATIONS

International Search Report corresponding to International Application No. PCT/EP2022/050461 dated May 13, 2022, 9 pages.

"Clear Aligners", Wikipedia reprinted from the Internet at: https://en.wikipedia.org/wiki/Clear_aligners#cite_note-invisalignsystem-10.

Selim, et al., "Mesh Deformation Appraoches—A Survey", J Phys Math 2016, reprinted from the internet at: https://www.hilarispublisher.com/open-access/mesh-deformation-approaches--a-survey-2090-0902-1000181.pdf.

"Iterative Closest Point", Wikipedia reprinted from the Internet: https://fr.wikipedia.org/wiki/Iterative_Closest_Point.

Batina, "Unsteady Euler Airfoil Solutions Using Unstructured Dynamic Meshes", AIAA Journal 28, 1990, 1381-1388.

C. Farhat, et al., "Torsional Springs for Two-Dimensional Dynamic Unstructured Fluid Meshes", Computer Methods in Applied Mechanics and Engineering, 163, 1998, 231-245.

F. Blom, "Considerations on the spring analogy", International Journal for Numerical Methods in Fluids 32, 2000, 647-668.

Bottasso, "The ball-vertex method: a new simple analogy method for unstructured dynamic meshes", Computer Methods in Applied Mechanics and Engineering, 194, 2005, 4244-4264.

Markou, et al., "The ortho-semi-torsional (OST) spring analogy method for 3D mesh moving boundary problems", Computer Methods in Applied Mechanics and Engineering, 196, 2007, 747-765.

Thompson, et al.. "Numerical Grid Generation, Foundations and Applications". Elsevier Science Publishing Company, New York, 1985.

Zhao, et al., "General method for simulation of fluid flows with moving and compliant boundaries on unstructured grids", Computer Methods in Applied Mechanics and Engineering, 192, 2003, 4439-4466.

Witteveen, et al., "Explicit and Robust Inverse Distance Weighting Mesh Deformation for CFD", 48th AIAA Aerospace Sciences Meeting Including the New Horizons Forum and Aerospace Exposition, USA, 2010.

Boer, et al., "Mesh Deformation Based on Radial Basis Function Interpolation". Journal of Computers and Structures 45, 2007, 784-795.

* cited by examiner

[Fig 1]

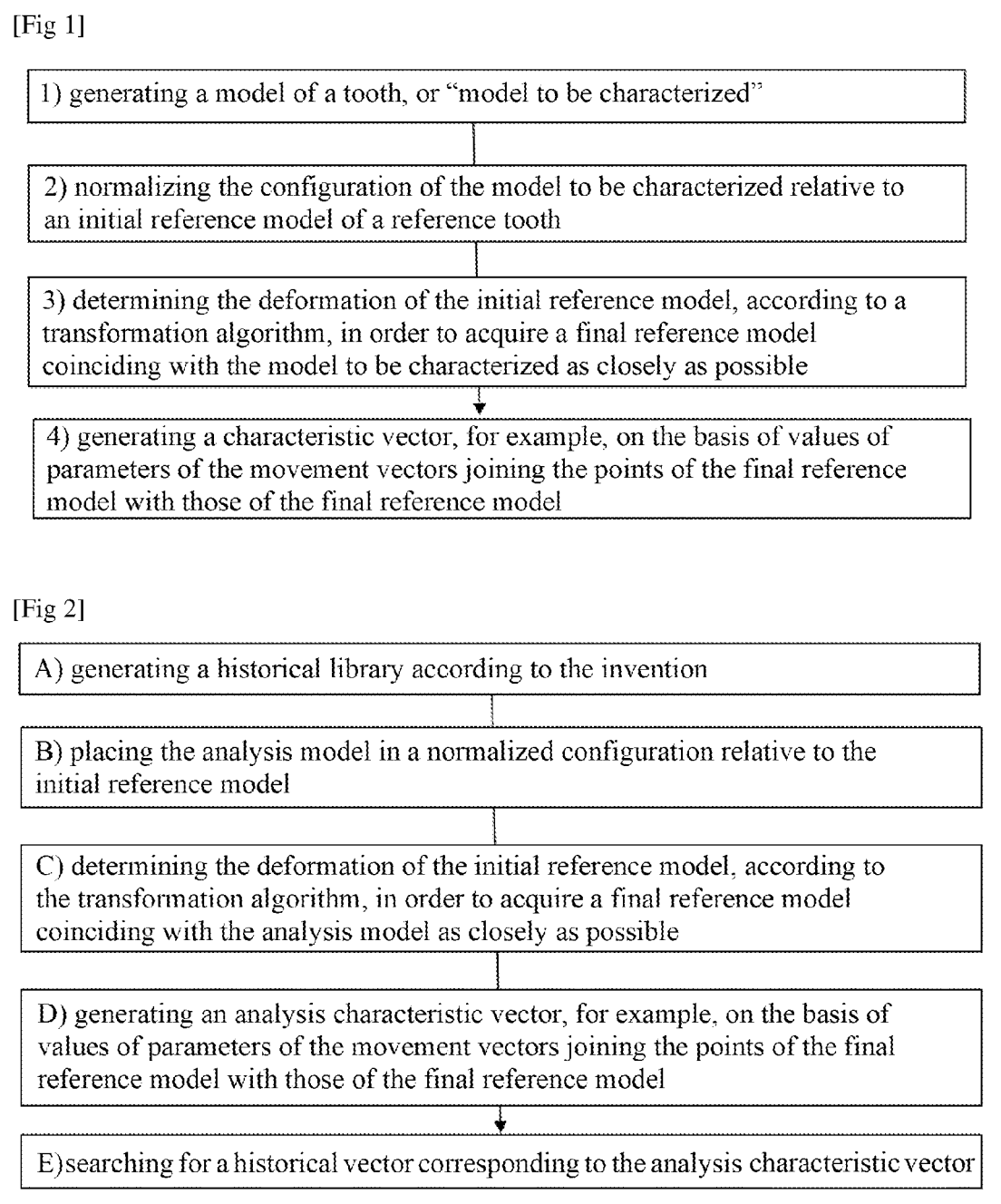

1) generating a model of a tooth, or "model to be characterized"

2) normalizing the configuration of the model to be characterized relative to an initial reference model of a reference tooth 3) determining the deformation of the initial reference model, according to a transformation algorithm, in order to acquire a final reference model coinciding with the model to be characterized as closely as possible 4) generating a characteristic vector, for example, on the basis of values of parameters of the movement vectors joining the points of the final reference model with those of the final reference model

[Fig 2]

A) generating a historical library according to the invention

B) placing the analysis model in a normalized configuration relative to the initial reference model C) determining the deformation of the initial reference model, according to the transformation algorithm, in order to acquire a final reference model coinciding with the analysis model as closely as possible D) generating an analysis characteristic vector, for example, on the basis of values of parameters of the movement vectors joining the points of the final reference model with those of the final reference model E)searching for a historical vector corresponding to the analysis characteristic vector

[Fig 3]
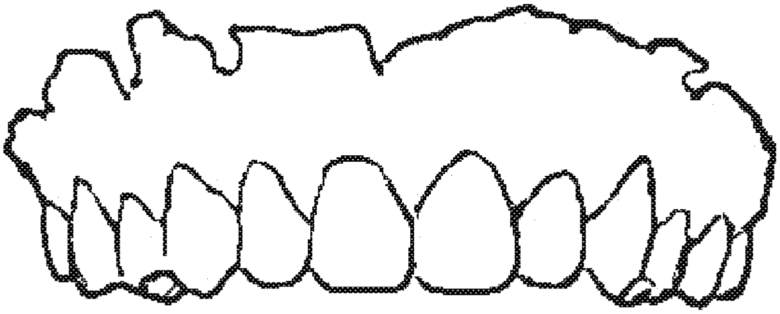
[Fig 4]
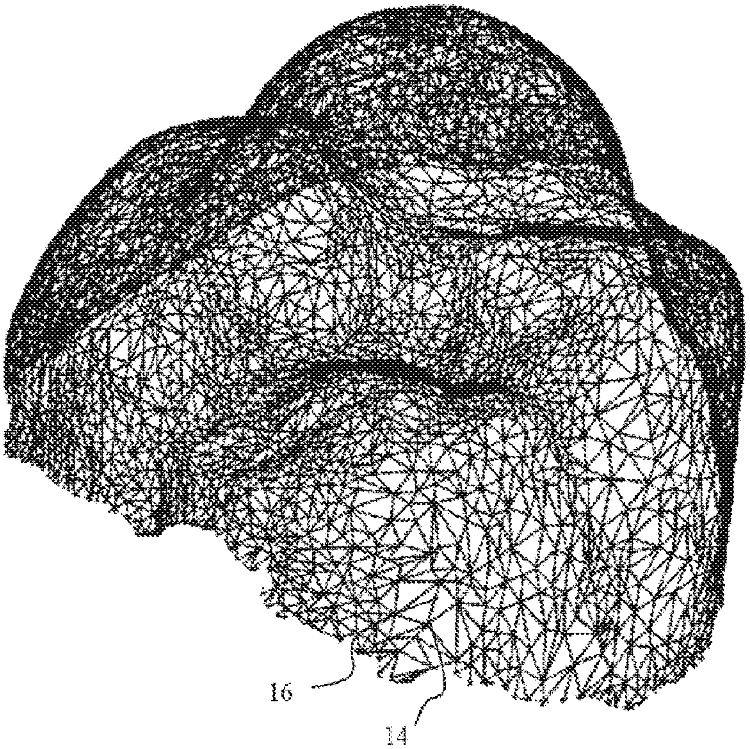

[Fig 5]
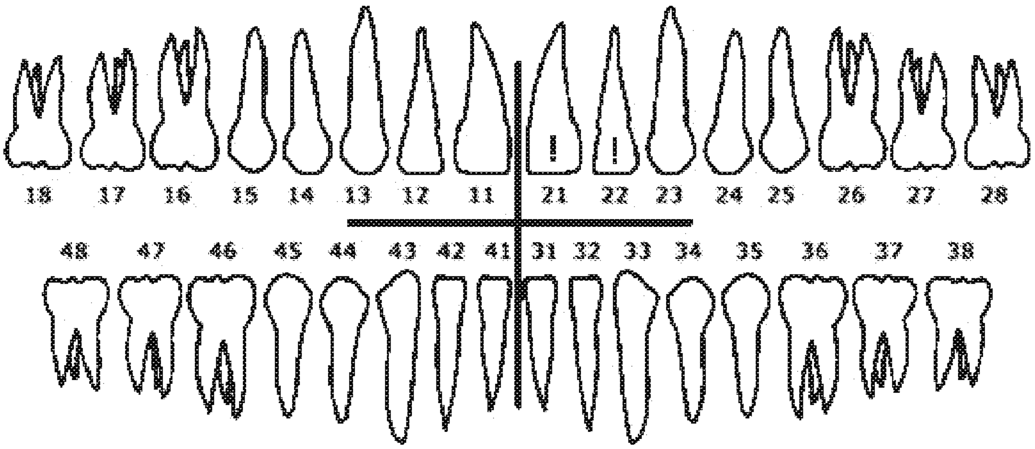

METHOD FOR CHARACTERIZING AN INTRAORAL ORGAN

TECHNICAL FIELD

The present invention relates to a method for characterizing an intraoral organ.

The invention also relates to a method for generating a database of tooth models, to a method for correcting a tooth model on the basis of this database, to a method for generating a model of an intraoral organ, to a method for detecting a shape anomaly of an intraoral organ, to a method for identifying an individual, to a method for assessing an attribute on the basis of a three-dimensional representation of an intraoral organ, to a method for computerized compression of a database of historical models. These methods advantageously implement a characterization method according to the invention.

PRIOR ART

The most recent orthodontic treatments use three-dimensional models of dental arches, themselves divided into three-dimensional tooth models. The tooth models can be moved, in particular in order to model future dental situations, for example, to model the arrangement of the teeth at the end of an orthodontic treatment.

A scan of the dental arches of an individual, carried out at an initial time, typically at the start of an orthodontic treatment, nevertheless does not allow complete tooth models to be defined, notably because some parts of the scanned teeth can be hidden by other teeth or by an orthodontic appliance.

When the tooth models are then moved, they can thus reveal "white areas" in the regions that cannot be observed at the initial time. They therefore do not allow, in particular, subsequent detection of a deformation of a tooth or of the gingiva in these regions.

This problem is particularly critical when a tooth model is used for manufacturing an orthodontic appliance, for example, within the context of resuming an ineffective treatment or for producing a post-treatment contention orthodontic appliance.

PCT/EP2019/052121 describes a method allowing the white areas of a model to be limited, in particular in the reference models described in WO 2016/066651. However, this method requires the acquisition of images. Such images are not always available or of satisfactory quality.

Therefore, a requirement exists for limiting the white areas of tooth models.

More generally, a requirement exists for a method for quickly searching for missing information relating to a tooth model, and/or for correcting any erroneous information of a tooth model.

An aim of the invention is to at least partially address these requirements.

SUMMARY OF THE INVENTION

The invention relates to a method for characterizing an intraoral organ to be characterized, preferably a tooth, said method comprising the following steps:

1) modelling the intraoral organ to be characterized in the form of a digital three-dimensional model, or "model to be characterized", comprising a mesh of points defining a surface;

2) placing said model to be characterized in a standardized configuration with respect to a digital three-dimensional model, called "initial reference model", preferably a digital three-dimensional mode of a reference intraoral organ, the initial reference model comprising a mesh of points, called "initial reference points"; then 3) determining a final reference point, for each initial reference point, by means of a deformation algorithm, then determining a set of values determining the position of the final reference point and/or determining a final elementary surface depending on said final reference point, preferably defined by interpolation on the basis of said final reference point by means of several pairs each consisting of an initial reference point and the associated final reference point (i.e., determined by the deformation algorithm on the basis of this initial reference point);

the deformation algorithm determining the positions of the final reference points so that the final reference model consisting of a mesh of the final reference points matches the model to be characterized as closely as possible;

4) generating a characteristic vector grouping, in an ordered manner, the values determined in step 3) for all said initial reference points.

Determining the final reference points in step 3) corresponds to the deformation of the initial reference model so as to acquire the final reference model, which approximates the model to be characterized as closely as possible, i.e., such that the difference in shape between these two models is minimal. The deformation algorithm stipulates the rules that guide this deformation, as well as the criteria allowing said difference to be determined. These criteria allow the closeness of the shape between a deformed initial reference model and the model to be characterized to be determined, and therefore allow the deformed initial reference model to be determined that matches the model to be characterized "as closely as possible", according to these criteria specific to the deformation algorithm. The initial reference model thus deformed is the final reference model. The final reference model can be different depending on the deformation algorithm implemented for the acquisition thereof.

In one embodiment, the deformation algorithm deforms the mesh of the initial reference model by stipulating constraints for the deformation, for example, by setting the elasticity of the mesh. The deformation is then referred to as "constraint deformation". Preferably, the closest possible match with the model to be characterized is considered to be achieved when the cumulative distance between said final reference points and the surface of the model to be characterized is minimal.

In a preferred embodiment, the deformation algorithm comprises a function for projecting the initial reference point onto the surface of the model to be characterized. Preferably, the deformation algorithm computes, for each initial reference point, a point of the surface of the model to be characterized that is as close as possible to this initial reference point. The points of the surface of the model to be characterized determined in this way constitute the final reference points, with the match of the final reference model being as close as possible to the model to be characterized.

The deformation algorithm can stipulate that the final reference points are points of the surface of the model to be characterized, preferably that they are mesh points of the model to be characterized.

Preferably, in step 3), the deformation algorithm is a constraint deformation algorithm of the mesh of the initial reference model or an algorithm for projecting initial reference points onto the surface of the model to be characterized. Unlike an optimization method ("best fit"), these algorithms do not search, for all the initial points, for a set of final points providing the "optimal" final reference model, i.e., the closest, in absolute terms, to the model to be characterized. The constraints stipulated by a constraint deformation algorithm actually limit the possibilities of deformation and a projection algorithm does not iteratively search for the final reference points, but successively searches for a final reference point for each initial reference point.

The constraint and projection deformation algorithms advantageously allow very fast processing, much faster than an optimization method. They are particularly well adapted when the characteristic vector acts as a "signature" of the initial reference model, with the signature not being intended to include the information required to build the model that it designates, but only to designate it in a specific manner.

The set of values determined in step 3) allows the position in space of the final reference point and/or said final elementary surface to be defined directly or indirectly.

These values particularly can be a value of:

- preferably, a parameter of the movement vector, the origin of which is the initial reference point and the end of which is the respective final reference point; or
- preferably, a parameter of a function determining the position of the final reference point on the basis of the position of the initial reference point, in particular of a function ensuring projection of the initial reference point onto the surface of the model to be characterized; or
- a parameter assisting the definition of the position of the initial reference point, for example, its abscissa.

Preferably, in step 3), one of said sets of values is determined, for each initial reference point, which allows the construction, on the basis of an initial reference point, of a final elementary surface close to the associated final reference point, preferably a final elementary surface passing through the associated final reference point. The values of such a set are preferably the values of a parameterization of an interpolation function determining a final elementary surface by interpolation on the basis of several pairs, each consisting of an initial reference point and of the associated final reference point, preferably on the basis of all said pairs.

Preferably, the interpolation function allows a final elementary surface to be determined around each final reference point. The interpolation function is preferably a radial basis function. The set of values determined in step 3) preferably comprises the values of the parameterization of the radial basis function.

Combining all the final elementary surfaces thus provides a "final" surface that matches the model to be characterized as closely as possible.

Preferably, in step 4), said characteristic vector comprises, preferably consists of, parameterizations of an interpolation function determined so that said interpolation function, parameterized with one of said parameterizations, generates a final elementary surface for an initial reference point.

The higher the number of initial reference points, the closer the shape of the final reference model is to that of the model to be characterized. The lower the number of initial reference points, the smaller the characteristic vector, and therefore the easier it is to manipulate and store.

It is not essential to generate the final reference model, for example, so that it can be viewed or manipulated by a computer.

As will be seen in further detail throughout the remainder of the description, a characterization method, or "vectorization method", according to the invention allows a database of indexed historical models to be generated.

The invention thus relates to a method for generating a database of indexed historical models, called "indexed historical library", said method comprising, for each intraoral organ of a set of intraoral organs comprising more than 500 intraoral organs:

- characterizing according to a characterization method according to the invention so as to determine a model of the intraoral organ, or "historical model", and a historical characteristic vector corresponding to the historical model; then
- forming a record, called "historical record", comprising said historical characteristic vector and said historical model; then
- adding said historical record to the indexed historical library.

Preferably, the intraoral organs are teeth.

In one embodiment, all the teeth of said set of teeth have the same tooth number or are of the same type, and the initial reference model represents a reference tooth that has said number or is of the same type, respectively.

In one embodiment, all the teeth of said set of teeth have the same tooth number and, preferably, the reference tooth has said number.

Preferably, the teeth of said set of teeth have different tooth numbers or are of different types, and the initial reference model used to determine a historical characteristic vector is the same, irrespective of the tooth considered in the set of teeth. The initial reference model common to the set of teeth is not necessarily a model of a tooth. It can assume any shape, for example, the shape of a sphere.

Each historical model is thus indexed by means of a historical characteristic vector that at least partially converts the deformation necessary for, after placing the historical model in a standardized configuration with respect to the initial reference model, transforming the initial reference model into a final reference model that is substantially identical to said historical model. The historical characteristic vector of a historical model is therefore an index that thus can be used for rapid identification of the historical model in the indexed historical library.

This method particularly can be implemented for a plurality of said sets of intraoral organs, with said intraoral organs being teeth, each set containing only teeth with the same number or of the same type, and the reference tooth used when characterizing the teeth of said set having said number or being of said type, respectively, with the number of initial reference points preferably depending on said number or on said type.

The historical library allows "analysis" models to be corrected.

The invention particularly relates to method for correcting a digital three-dimensional model, called "analysis model", modelling an intraoral organ, called "intraoral analysis organ", preferably a tooth, said method comprising the following steps:

- generating an indexed historical library according to a method according to the invention;
- characterizing the intraoral analysis organ, according to a characterization method according to the invention, so as to generate said analysis model and an "analysis" characteristic vector corresponding to the analysis model;

searching, in the indexed historical library, for a historical record comprising a historical characteristic vector that optimally matches the analysis characteristic vector, and correcting the analysis model with the historical model of said historical record, with the correction being able to involve replacing the analysis model with the historical model.

In one embodiment, all the historical models of the indexed historical library, the initial reference model and the analysis model teeth with the same number or of the same type.

Preferably, the historical models of the indexed historical library model teeth with numbers that can be different or that can be of different types, and the initial reference model used to determine the historical characteristic vectors is always the same, irrespective of the historical model. In one embodiment, for said search, the following steps are carried out:

e1) defining a filter relating to one or more parameters of the historical characteristic vectors;

e2) filtering the indexed historical library with said filter so as to retain a subset of the indexed historical library;

e3) modifying the filter, by making the filtering conditions stricter by increasing the number of parameters involved in the filter and/or by enhancing the filtering conditions of said filter;

e4) filtering said subset with the modified filter so as to define a new subset, with the cycle of steps e3) and e4) being repeated until the subset acquired in step e3) comprises less than 5 historical records;

e5) correcting the analysis model with the historical model of one of said historical records derived from step e4).

Preferably, the historical model of the historical record found following said search is used to fill a white area (i.e., devoid of points) of the analysis model and/or to remove any errors in the analysis model and/or to replace part of the analysis model with a surface of said historical model, and/or to replace the analysis model with said historical model.

A characterization method according to the invention also allows several other applications, according to the invention.

For some of these applications, a historical library, or only a database of historical characteristic vectors, must be created.

The invention thus relates to a method for generating a database of historical characteristic vectors, said method comprising, for each intraoral organ of a set of intraoral organs comprising more than 500 intraoral organs, called "historical intraoral organ", characterizing said historical intraoral organ according to a characterization method according to the invention, then the following step 5'):

5') adding the vector, or "historical characterization vector", determined by said characterization to a database of historical characteristic vectors.

On the basis of this database of historical characteristic vectors and of the initial reference model, it is advantageously possible, for each historical characteristic vector, to acquire a model substantially representing the model acquired during step 1) of the characterization of the historical intraoral organ that resulted in the historical characteristic vector.

Preferably, the intraoral organs are teeth. In one embodiment, all the teeth of said set of teeth have the same tooth number or are of the same type, and the initial reference model models a reference tooth that has said number or is of the same type, respectively.

Preferably, the teeth of said set of teeth have numbers that can be different or be of different types, and the initial reference model, which may or may not represent a tooth, is always the same, irrespective of the tooth of said considered set.

The invention thus relates to a method for generating a model of an intraoral organ, said method comprising generating a characteristic vector according to a characterization method according to the invention, then, on the basis of the characteristic vector and of said initial reference model, deforming the initial reference model by moving the initial reference points as a function of said characteristic vector.

Preferably, the initial reference model is a model representing a reference intraoral organ. In order for the model generated by this method to assume a shape that is close to that of the model to be characterized that resulted in the characteristic vector, the initial reference model preferably assumes a shape as close as possible to the model to be characterized. In particular, if the intraoral organs are teeth, the initial reference model and the model to be characterized preferably represent teeth that have the same tooth number or are of the same type.

Preferably, this method comprises:

generating a database of historical characteristic vectors according to the invention, then, on the basis of a historical characteristic vector included in said database of historical characteristic vectors and of the initial reference model used for this generation, deforming the initial reference model by moving the initial reference points as a function of said historical characteristic vector.

The historical characteristic vector actually provides values that allow, on the basis of the initial reference points, final reference points and/or a final surface to be defined in space, and thus allow a final reference model to be achieved assuming a shape that is close to that of the historical model. Applying these values to the initial reference points thus results in a final reference model substantially identical to the historical model corresponding to the historical characteristic vector. It is therefore possible to reconstruct models that are very close to the historical models, which avoids having to store them.

Furthermore, if the intraoral organ is not an intraoral organ used for generating the database of historical characteristic vectors, it is possible to search for a historical characteristic vector that best corresponds to this intraoral organ. Preferably, a characterization method is applied to this intraoral organ and the historical characteristic vector closest to the characteristic vector acquired for this intraoral organ is sought.

Reconstructing the historical model associated with this historical characteristic vector thus allows a model to be acquired that substantially represents the intraoral organ.

On the basis of the database of historical characteristic vectors, it is also possible to detect anomalies on the intraoral organs. In particular, the invention relates to a method for detecting a shape anomaly of an intraoral organ "to be tested", said method comprising the following steps:

c) characterizing the intraoral organ to be tested according to a characterization method according to the invention, so as to acquire a characteristic vector "to be tested";

d) comparing, for at least one parameter of the characteristic vector to be tested, the value of said parameter with a pre-defined range of "acceptable" values;

e) generating, if said value to be tested does not belong to said range, a notification indicating the existence of a shape anomaly, the notification preferably specifying the region of the intraoral organ to be tested affected by the shape anomaly.

An anomaly is considered to exist when an initial reference point moves excessively during the deformation of the initial reference model in order to acquire the final reference model. This separation is typically provided by the values of three parameters in the characteristic vector to be tested (which provide, for example, the movements along the three axes of an orthonormal coordinate system). The three ranges corresponding to these three parameters thus determine the set of acceptable movements for said initial reference point, i.e., a tolerance with respect to the reference intraoral organ at the site of the considered initial reference point. The notification is an item of information indicating that this tolerance has been exceeded. It preferably specifies the relevant initial reference point.

A range of "acceptable" values for a parameter is preferably defined according to the following steps:

a) generating, according to the invention, for a plurality of historical intraoral organs, a database of historical characteristic vectors or a database of indexed historical models, and, for at least some of the historical intraoral organs, preferably for each of the historical intraoral organs, determining whether the situation relating to the relevant intraoral organ is acceptable;

b) determining ranges of "acceptable" values for at least some of the parameters of the historical characteristic vectors of the database of historical characteristic vectors or of the database of indexed historical models, preferably for each of said parameters, with a value being considered to be acceptable if, with respect to step a), the probability of the dental situation associated with said value being acceptable exceeds a probability threshold.

On the basis of a database of historical characteristic vectors generated according to the invention, optionally integrated into an indexed historical library generated according to the invention, it is also possible to identify an individual, particularly when the intraoral organs are teeth.

The invention thus relates to a method for identifying an individual, said method comprising the following steps:

i) generating, at a first time, according to a generation method according to the invention, an indexed historical library or a database of characteristic vectors; and associating each historical characteristic vector, the indexed historical library or the database of characteristic vectors, resulting from the processing of a model of an intraoral organ, preferably a tooth, with an identifier of the individual wearing said intraoral organ, ii) at a second time after the first time:

characterizing a target intraoral organ of a target individual to be identified, according to a characterization method according to the invention, so as to determine a digital three-dimensional model, or "target model", of the intraoral organ, and a corresponding target characteristic vector; then searching, in the indexed historical library or in the database of historical characteristic vectors, for a historical characteristic vector corresponding to the target characteristic vector and having the identifier associated with said historical characteristic vector.

Finally, a characterization method according to the invention allows a simple three-dimensional representation of the intraoral organ to be provided. This representation advantageously can be analyzed by means of a neural network.

The invention thus relates to a method for assessing an attribute on the basis of a three-dimensional representation, called "assessment representation", of an intraoral organ, called "intraoral assessment organ", preferably a tooth, of an individual, called "assessment individual", said method comprising the following steps:

creating a learning database comprising more than 1,000 historical structures, each historical structure comprising:

a three-dimensional representation, called "historical representation", of a "historical" intraoral organ of a "historical" individual; and a "historical" descriptor containing a "historical" value, relating to the historical individual, for said attribute;

training at least one neural network by means of the training database;

submitting the assessment representation to said neural network so that it determines, for said assessment representation, at least one "assessment" value for said attribute;

the method comprising characterizing, according to a characterization method according to the invention, historical intraoral organs and the assessment intraoral organ in order to generate, as historical representations and an assessment representation, respectively, historical characteristic vectors and an "assessment characteristic vector", respectively.

Any method according to the invention can also notably comprise one or more of the following optional features:

all said intraoral organs are teeth;

all the teeth have the same tooth number or are of the same type;

the initial reference model represents a population of individuals;

the reference model is a model of a typodont;

the number of initial reference points depends on said number or on said type;

in a characterization method according to the invention, the number of initial reference points is greater than 10 and/or less than 10%, preferably less than 1%, of the number of points of the model to be characterized;

the number of initial reference points is greater than 10, 50, 100, 400 and/or less than 10,000, 5,000, 1,000, 800;

each characteristic vector (historical, to be tested, target, analysis, assessment, etc.) comprises more than 10 and less than 1,000 values;

in step 3), the deformation algorithm completes a constraint deformation of the initial reference model;

said assembly comprises a parameterization of an interpolation function capable of generating a final elementary surface around the final reference point;

preferably, in step 3), the deformation algorithm implements said interpolation function on the basis of several pairs of initial reference points and associated final reference points, preferably on the basis of all the initial and final reference points, so as to determine a "final" surface that substantially extends along the final reference points;

preferably, the interpolation is carried out by means of a radial basis function (RBF);

in step 4), said characteristic vector comprises only values of the parameterization of said interpolation function.

The invention also relates to:

a computer program, and in particular a specialized application for a mobile telephone, comprising program code instructions for executing one or more steps of any method according to the invention when said program is executed by a computer;

a computer medium, on which such a program is stored, for example, a memory or a CD-ROM.

The invention also relates to:

a computer, in which a program according to the invention is loaded; and a system comprising a scanner in order to model an intraoral organ to be characterized in the form of a model to be characterized, and a computer according to the invention capable of implementing a characterization method according to the invention on the basis of said model to be characterized, and optionally one or more of the other methods according to the invention.

The methods according to the invention also can be implemented for intraoral organs other than teeth, for example, for a gingiva.

Definitions

The term "individual" means any person for whom a method according to the invention is implemented, whether or not this person is ill.

An "orthodontic treatment" is all or part of a treatment intended to modify the configuration of a dental arch (active orthodontic treatment) or to maintain the configuration of a dental arch (passive orthodontic treatment).

According to the international convention, each tooth of a dental arch has a predetermined number. The tooth numbers defined by this convention are listed in FIG. 5.

The term "dental device" means any device intended to be worn by a dental arch, and in particular an orthodontic appliance, a crown, an implant, a bridge, or a facet.

An "intraoral organ" is an element inside the mouth of an individual. An intraoral organ in particular can be a tooth, a soft tissue, and in particular the gingiva, or a dental device arranged in the mouth, for example, an orthodontic or dental appliance or part of an orthodontic or dental appliance, notably an orthodontic appliance with an arch and fasteners, an orthodontic aligner, a bracket, an orthodontic arch, or a filling or an implant or a prosthesis.

A "model" means a digital three-dimensional model. A model consists of a set of voxels. It conventionally comprises a mesh consisting of points connected by straight segments, i.e., an assembly of triangles.

A "tooth model" is a digital three-dimensional model of a tooth. A model of a dental arch can be cut so as to define tooth models, for at least some of the teeth, preferably for all the teeth represented in the model of the arch. The tooth models are therefore models within the model of the arch.

A "model of an arch" is a model representing at least part of a dental arch, preferably at least 2, preferably at least 3, preferably at least 4 teeth.

"Cutting" a model of an arch into "tooth models" is an operation allowing the representations of the teeth (tooth models) in the model of the arch to be delimited and rendered autonomous. Computing tools exist for manipulating the tooth models of an arch model. An example of software for manipulating the tooth models and creating a treatment scenario is the Treat program, described on the webpage: https://en.wikipedia.org/wiki/Clear_aligners#cite_note-invisalignsystem-10.

A 3D scanner, or "scanner", is a well known appliance allowing a model of a dental arch or of a tooth to be acquired.

A model is said to be "constant mesh" modified when the distance between the adjacent points of this model is kept constant. In other words, the triangles that constitute the model are not modified, so that the arrangement of these points relative to one another is constant.

Such a modification corresponds to a movement of the model in space, by translation and/or by rotation, without modifying the shape thereof. Indeed, the relative positions of all the points of the model are retained.

Unlike a modification of a constant mesh model, a "deformation" modifies the shape of the model, i.e., modifies the mesh. Algorithms for deforming a model are known, for example, from: https://www.hilarispublisher.com/open-access/mesh-deformation-approaches-a-survey-2090-0902-1000181.pdf. These deformation algorithms can be used.

In particular, a deformation of the initial reference model can be computed "by means of a radial basis function" in steps 3), 3") or (C). In order to carry out such a deformation, a corresponding final reference point on the surface of the model to be characterized is determined for each initial reference point, preferably by projection, which corresponding final reference point is, then, by means of a radial basis function, a final reference surface around the final reference point (step 3)). The surface of the model to be characterized particularly can be a target surface (step 3")) or an analysis surface (step C)).

Interpolation by means of a radial basis function ("Radial Basis Function Interpolation") is described in: https://www.hilarispublisher.com/open-access/mesh-deformation-approaches-a-survey-2090-0902-1000181.pdf.

The "parametrization" of a function is made up of all the values of the parameters of this function. For example, for an affine function f (x, y, z)=a.x+b.y+c.z, the parameters are a, b and c, and a parameterization is, for example, (1; 2; 1.5), i.e., a=1, b=2, and c=1.5.

When the deformation algorithm uses a projection function to determine the position of the final reference points, the parameterization of this function is preferably common to all the initial reference points. Alternatively, it can be determined as a function of the considered initial reference point. For an initial reference point, the set made up of the coordinates of the initial reference point and by the parameterization of this function for this initial reference point constitutes an example of a "set of values determining the position of the final reference point".

When the deformation algorithm uses an interpolation function, for example, a radial basis function, to generate a final elementary surface associated with a final reference point, the set determined in step 3) can be made up of, for example, the parameterization of this interpolation function, and optionally of the coordinates of the initial reference point if said coordinates cannot be deduced from the ordering of the values in the characteristic vector.

A final elementary surface is considered to be "dependent on a final reference point" or "associated with a final reference point" when it is generated on the basis of the final reference point, preferably by interpolation on the basis of the final reference point by means of several pairs each made up of an initial reference point and of the associated final reference point, preferably on the basis of all said pairs.

In general, a set of values "determining the position of the final reference point" is information that is complete enough to allow the position of the final reference point to be determined on the basis of this set of values. A set of values "determining a final elementary surface" is an item of information that is complete enough to allow this surface to be determined on the basis of this set of values. A person skilled in the art knows perfectly well how to define such sets. Such a set comprises, for example, the coordinates of the movement vector between the initial reference point and the final reference point, or the parameterization of a function for projecting the initial reference point onto the surface to be characterized, or the parameterization of an interpolation function.

All the values of one of said sets of values can be grouped in the characteristic vector, but are not necessarily grouped as such. In particular, when the positions of the initial reference points are known and these points are ordered, it is possible to determine the initial reference point that corresponds to a parameter of the characteristic vector as a function of the position of the parameter in the characteristic vector. For example, it will be known that the n first parameters are associated with the first initial reference point, that the n following parameters are associated with the second initial reference point, etc. It is then unnecessary to integrate the positions of the initial reference points in the characteristic vector.

Furthermore, it is not worthwhile grouping parameters in the characteristic vector with a value that would be the same irrespective of the considered initial reference point. For example, if the parameterization of a projection function used to determine the final reference points is identical for all the initial reference points, it is not worthwhile repeating it, for each initial reference point, in the characteristic vector.

In one embodiment, the characteristic vector comprises only values of sets of values determining final elementary surfaces.

In order for the characteristic vectors to be comparable to each other, each model to be characterized (historical, analysis, to be tested, etc.) must be arranged in the same way with respect to the initial reference model before determining the final reference points. This normalization of the model to be characterized, or "resetting", results in a "normalized" configuration of the model to be characterized with respect to the initial reference model.

The normalization methods are well known. In particular, an Iterative Closest Point (ICP) search algorithm can be used. An example of an iterative closest point search algorithm is described in: https://fr.wikipedia.org/wiki/Iterative_Closest_Point. These methods also allow, if necessary, the model to be characterized to be rendered to the same scale as the initial reference model.

The "match" or "fit" between two characteristic vectors, in particular between an analysis characteristic vector or a target characteristic vector and a historical characteristic vector, is the inverse of the measurement of a difference between these characteristic vectors. A match is the maximum match ("best fit") when said difference is minimal. Methods for assessing differences between characteristic vectors and finding the smallest difference are well known. For example, the difference can be a Euclidean distance between the characteristic vectors to be compared.

Similarly, a first model matches a second model as closely as possible when their shapes are as close as possible. Methods for measuring the difference in shape between two models are well known. For example, the cumulative distance between the points of the first model and the surface of the second model is a measurement of this difference.

The "cumulative" distance between a set of points and a surface is the sum of the distances between these points and this surface.

A "vector" conventionally is an ordered set of values, with each value quantifying a respective parameter.

A "movement" vector defines values for parameters defining a movement of a point in space. It thus provides the coordinates for a movement of a point in space. The length of the vector, or "norm" of the vector, is the length of this movement.

A movement vector in a three-dimensional space can be defined by a set of three values for three respective parameters, for example, values (x, y, z) for a movement in a Cartesian coordinate system, or values (ρ, θ, h) for a movement in a cylindrical coordinate system, or values (r, θ, φ) for a movement in a spherical coordinate system.

For example, if a point M1, of coordinates (x1, y1, 21) in an Oxyz coordinate system, is moved to a point M2, of coordinates (x2, y2, z2) in this same coordinate system, the vector (x2-x1, y2-y1, z2-z1) is a movement vector.

A "characteristic" vector is made up of values specific to a model and forms an identifier, or a "signature", of this model.

A method for generating an indexed historical library is considered to involve generating a database of historical characteristic vectors. A database of historical characteristic vectors nevertheless can be generated without generating an indexed historical library (when the records do not include historical models).

The methods according to the invention are implemented by a computer, preferably exclusively by a computer. The term "computer" means any electronic appliance, which includes a set of several machines having computer processing capabilities.

Conventionally, a computer particularly comprises a processor, a memory, a human-machine interface, conventionally comprising a screen, an Internet communication module, via Wi-Fi, via Bluetooth® or via the telephone network. Software configured to implement a method of the invention is loaded into the memory of the computer. The computer also can be connected to a printer.

The computer can be a server remote from the user, for example, it can be the "cloud".

For the sake of clarity, the terms "historical", "analysis", "to be tested" or "assessment" are used in order to distinguish what relates to an individual or to a historical, analysis, to be tested or "assessment" model, respectively. "To be characterized" is also used for the sake of clarity. Depending on the context, an element "to be characterized" can be a "historical", "analysis", "to be tested" or "assessment" element.

"Historical" is used to refer to a database comprising numerous objects, for example, a database of historical characteristic vectors or a learning database made up of historical structures. "Historical" can therefore qualify various objects, depending on the context.

"Historical" can particularly qualify vectors of an indexed historical library or of a database of historical characteristic vectors, which, unlike an indexed historical library, does not contain the historical models.

"Including" or "comprising" or "having" must be understood in a non-limiting manner, unless otherwise indicated.

BRIEF DESCRIPTION OF THE FIGURES

Further features and advantages of the invention will become more clearly apparent upon reading the following detailed description and with reference to the accompanying drawings, in which:

FIG. 1 schematically shows the various steps of a generation method according to the invention;

FIG. 2 schematically shows the various steps of a correction method according to the invention;

FIG. 3 shows an example of a view of a dental arch model;

FIG. 4 shows an example of a view of a tooth model;

FIG. 5 illustrates the numbering of the teeth used in the dental field.

DETAILED DESCRIPTION

In general, the invention relates to a method in which a model of an intraoral organ is "summarized" in the form of a characteristic vector. In a computer memory, the size of the characteristic vector, in bytes, preferably is at least ten times smaller, preferably at least 100 times smaller, than that of the model.

Preferably, the characteristic vector nevertheless comprises enough information to substantially reconstruct the model on the basis of an initial reference model. Preferably, to the actual scale, the difference between the reconstructed model and the model that has been summarized by the characteristic vector is less than 1 mm, preferably less than 0.5 mm, preferably less than 0.2 mm, preferably less than 0.1 mm, preferably less than 0.05 mm and/or greater than 0.01 mm.

The following description relates to teeth, for which the invention is particularly useful. However, it extends to any intraoral organ.

The invention therefore particularly proposes a method for characterizing a tooth, said method comprising the following steps:

1) modelling said tooth in the form of a digital three-dimensional model comprising a mesh of points defining a surface;
2) placing said model in a standardized configuration with respect to a digital three-dimensional model of a reference tooth, called "initial reference model", comprising a mesh of points, called "initial reference points": then
3) for each initial reference point,
   determining a final reference point, by means of a deformation algorithm; then
   determining a set of values determining the position of the final reference point and/or a final elementary surface depending on the final reference point, the deformation algorithm determining the positions of the final reference points so that the final reference model consisting of a mesh of the final reference points matches the model to be characterized as closely as possible;
4) generating a characteristic vector grouping, in an ordered manner, the values determined in step 3) for all said initial reference points.

The characteristic vector is a tool that characterizes said tooth and that is advantageously simpler and faster to use than the model of said tooth.

Method for Generating an Indexed Historical Library

The aim of a generation method according to the invention can be to create an indexed historical library that can be browsed quickly.

The invention particularly proposes a method for generating a database of indexed historical models, called "indexed historical library", said method comprising, for each "historical" tooth of a set of teeth comprising more than 500 teeth, the following steps:

1) modelling said tooth in the form of a digital three-dimensional model, called "historical model", comprising a mesh of points, called "historical points", defining a historical surface;
2) placing said historical model in a standardized configuration with respect to a digital three-dimensional model of a reference tooth, called "initial reference model", comprising a mesh of points, called "initial reference points"; then
3) for each initial reference point,
   determining a final reference point, by means of a deformation algorithm; then
   determining a set of values determining the position of the final reference point, for example, a parameter of the movement vector, the origin of which is the point of initial reference and the end of which is the respective final reference point, and/or determining a final elementary surface depending on the final reference point, the deformation algorithm determining the positions of the final reference points so that the final reference model consisting of a mesh of the final reference points matches the historical model as closely as possible;
4) generating a vector, called "historical characteristic vector", grouping, in an ordered manner, the values determined in step 3) for all said initial reference points;
5) forming a record, called "historical record", comprising the historical characteristic vector and the historical model; then
   adding said historical record to the indexed historical library.

For the sake of clarity, steps 1) to 4) are numbered as for the corresponding steps of the characterization method since they are identical to these steps, but only applied to "historical" teeth.

Cycles of steps 1) to 5) can be implemented for several sets of teeth comprising more than 500 teeth, with each set of teeth treated during a cycle containing only teeth with the same number or of the same type and the reference tooth used during said cycle having said number or being of said type, respectively.

Such an indexed historical library can particularly comprise more than 1,000, preferably more than 5,000, more than 10,000, and/or less than 1,000,000, or even less than 500,000, or even less than 100,000, or even less than 50.000 historical records, with each historical record comprising a historical model and an associated historical characteristic vector. The historical models each represent a different tooth.

The historical records can also comprise a description providing information relating to the modelled tooth, for example, the number of the tooth, or the type of tooth (i.e., its nature: "incisor", "canine", "molar").

Creating a historical record for a tooth comprises the above steps 1) to 5), as illustrated in FIG. 1. Therefore, these steps can be repeated for a set of teeth comprising more than 1,000 teeth, preferably more than 5,000 teeth, more than 10,000 teeth, and/or less than 1,000,000, or even less than 500,000 teeth, or even less than 100,000 teeth or even less than 50,000 teeth.

These teeth can belong to more than 1,000, preferably more than 5,000, more than 10,000 different individuals, and/or less than 1,000,000, or even less than 500,000, or even less than 100,000, or even less than 50,000 different individuals.

In step 1), the tooth is modelled, according to any known technique, preferably with a 3D scanner, so as to acquire a historical model. Such a model, called "3D" model, can be observed at any angle. An observation of the model, at a determined angle and distance, is called a "view". FIG. 4 shows an example of a view of a tooth model.

The historical model can be prepared on the basis of measurements taken on an actual tooth or on a mold of this tooth, for example, a plaster cast. It can also result from cutting a dental arch model into tooth models. FIG. 3 shows an example of a view of a dental arch model 10. A tooth model 12 has been isolated by cutting the dental arch model.

The historical model, as shown in FIG. 4, comprises a mesh of historical points 14 connected together by straight segments 16. Typically, a historical model comprises more than 200, preferably more than 500, more than 1,000, preferably more than 3,000, preferably more than 4,000 historical points, and/or less than 100,000, preferably less than 10,000, preferably less than 5,000 historical points.

A search for a historical model in the indexed historical library, and which relies on an analysis of the shape of the historical models, therefore takes a long time to carry out, even with a powerful computer, particularly if it must be carried out in less than 5 s, 3 s or 1 s.

In step 2), in order to assess the difference in shape between the historical model and an initial reference model, the initial reference model and the historical model are firstly placed in a standardized configuration, or "comparison configuration", defined according to configuration rules.

The initial reference model can be any model. However, it comprises much fewer points, called "initial reference points", than the historical model. Preferably, the number of initial reference points is less than 20%, 10%, 5%, 1%, 0.1% or 0.01% of the number of historical points.

Preferably, the number of initial reference points is greater than 10, 50, 100, 400 and/or less than 10,000, 5,000, 1,000, 800.

The initial reference points can be any reference points. The quality of the characterization is nevertheless better if the initial reference points are distributed substantially homogeneously on the surface of the initial reference model. Preferably, they form an even mesh, with the distances separating any point from the points that are adjacent to it all being identical.

Step 3) is even faster as the shape of the initial reference model is close to that of the historical model. Preferably, the initial reference model is therefore a model of a reference tooth, preferably of a reference tooth with the same number or of the same type as the teeth of the historical models.

The initial reference model particularly can be acquired by means of a 3D scanner.

In one embodiment, the initial reference model is acquired by simplifying a raw digital three-dimensional model with more than 1,000, more than 5,000, more than 10,000, more than 50,000 points, for example, generated by means of a 3D scanner. In other words, points of the raw model are deleted in order to acquire the initial reference model.

In one embodiment, the initial reference model is acquired by statistically processing a set of basic digital three-dimensional models, preferably modelling teeth with the same number or of the same type. The initial reference model can thus represent a population of individuals, for example, grouping people in an age group or that have suffered from the same illness.

The initial reference model can be the model of a typodont.

Preferably, the number of initial reference points depends on the number or type of the reference tooth modeled by the initial reference model.

Apart from possible modification of the scale, placing the initial reference model and the historical model in the comparison configuration is a constant mesh modification.

The configuration rules for placing the historical model with respect to the initial reference model particularly make provision for the initial reference model and the historical model being to the same scale, oriented in the same way in space, and at a predefined distance from each other. Preferably, the initial reference model and the historical model are centered on each other, such that, in the normalized configuration, the historical model coincides with the initial reference model as closely as possible, with the initial reference model and the historical model being substantially superimposed on each other.

In a preferred embodiment, for each historical point, a point of the initial reference model is associated by means of a "best fit" type search algorithm. i.e., a point of the closest initial reference model, then the historical model is positioned, without deforming it, in order to minimize the distances between the points of the historical model and the points associated with the points of the initial reference model.

In step 3), an algorithm, called "deformation algorithm", is firstly used, and on the basis of the initial reference model and of the historical model, to determine a final reference model that assumes a shape that is as close as possible to that of the historical model.

In particular, the deformation algorithm is configured to associate a final reference point with each initial reference point.

The deformation algorithm particularly can be based on a physical analogy or on an interpolation.

In one embodiment, the deformation algorithm deforms the initial reference model, while complying with constraints, in order to arrive at the final reference model. The constraints of the deformation algorithm stipulate rules for moving the initial reference points, for example, by fixing the elasticity of the initial reference model. For example, they can stipulate a deformation that is increasingly difficult to measure as a point is moved away from its initial position.

In particular, a deformation algorithm is known using:

- a linear spring analogy, developed by Batina (Batina, J T (1990), Unsteady Euler Airfoil Solutions Using Unstructured Dynamic Meshes. AIAA Journal 28: 1381-1388); or a variant of this analogy, notably:
- a torsional spring analogy, described in Farhat C., Degand C., Koobus B., Lesoinne M. (1998), "Torsional Springs for Two-Dimensional Dynamic Unstructured Fluid Meshes". Computer Methods in Applied Mechanics and Engineering, 163: 231-245;
- a semi-torsional spring analogy, described in Blom F. (2000), "Considerations on the spring analogy". International Journal for Numerical Methods in Fluids 32: 647-668;
- a ball-vertex analogy, described in Bottasso C L., Detomi D., Serra R. (2005), "The ball-vertex method: a new simple analogy method for unstructured dynamic meshes". Computer Methods in Applied Mechanics and Engineering, 194: 4244-4264;
- an Ortho-Semi-Torsional (OST) spring approach analogy, described in Markou G A., Mouroutis Z S., Charmpis D C., Papadrakakis M. (2007), "The ortho-semi-torsional (OST) spring analogy method for 3D mesh moving boundary problems". Computer Methods in Applied Mechanics and Engineering, 196: 747-765.

The deformation algorithm can also stipulate a linear elasticity for moving the initial reference points.

The deformation algorithm can also use Laplace smoothing equations or a modified Laplacian.

The search for the final reference model can be guided so that the cumulative distance between the final reference points and the historical surface is minimal, taking into account the constraints.

The deformation algorithm can implement any optimization method, preferably with a metaheuristic method, preferably by simulated annealing.

Said metaheuristic method notably can be selected from the group formed by:

- evolutionary algorithms, preferably selected from among:
- evolution strategies, genetic algorithms, differential evolution algorithms, distribution estimation algorithms, artificial immune systems, Shuffled Complex Evolution path composition, simulated annealing, ant colony algorithms, particle swarm optimization algorithms, Tabu searches, and the GRASP method;
- the kangaroo algorithm;
- the Fletcher and Powell method;
- the sound method;
- stochastic tunneling;
- ramping with random restarts;
- the cross-entropy method; and
- the hybrid methods between the metaheuristic methods mentioned above.

Preferably, the difference is measured, with the historical model, in a plurality of reference models "to be tested" acquired by different deformations of the initial reference model, exclusively by moving initial reference points. The difference between a reference model to be tested and the historical model can be assessed by adding the distances between the points of the reference model to be tested and the historical surface, with each distance being weighted as a function of the constraints stipulated by the deformation algorithm. The final reference model is then the reference model "to be tested" for which the measured difference is the lowest.

There is a movement vector for each initial reference point, the origin of said movement vector is the initial reference point and the end is the final reference point. This vector comprises three values, which together define this movement in space. Each of these values is therefore a value of a positioning parameter of the final reference point. These values particularly can be the distance along each of the three axes of an orthonormal coordinate system, between the initial reference point and the corresponding final reference point.

Other positioning parameter values are possible, for example, the length of the movement vector, the direction of the movement vector, the course of the movement vector or the distance in a predetermined direction between an initial reference point and the corresponding final reference point. Preferably, at least three positioning parameter values are determined so that they constitute, with the coordinates of the initial reference point, a set of values determining the position of the final reference point.

The deformation algorithm can also stipulate regeneration of the initial reference model.

In a preferred embodiment, the deformation algorithm defines, for each initial reference point, a final reference point by projecting the initial reference point onto the surface of the historical model. All the projection methods can be contemplated, for example, a projection so that the distance between the initial and final reference points is minimal. The projection method can stipulate that the final reference point is a point of the mesh of the historical model.

Preferably, the deformation algorithm carries out an interpolation on the basis of final reference points, and in particular of final reference points acquired by projecting onto the historical model.

The deformation algorithm can particularly implement:

- a transfinite interpolation, described in Thompson J F., Warsi Z U A., Mastin C W., (1985), "Numerical Grid Generation, Foundations and Applications". Elsevier Science Publishing Company, New York;
- an algebraic damping method, described in Zhao Y., Forhad A A. (2003), "General method for simulation of fluid flows with moving and compliant boundaries on unstructured grids". Computer Methods in Applied Mechanics and Engineering, 192: 4439-4466;
- an Inverse Distance Weighting method, for example, described in Witteveen J A S., (2010), "Explicit and Robust Inverse Distance Weighting Mesh Deformation for CFD". 48, h AIAA Aerospace Sciences Meeting Including the New Horizons Forum and Aerospace Exposition, USA;
- a radial basis function, or "RBF", like that described in Boer A D., van der Schoot M S., Bijl H. (2007), "Mesh Deformation Based on Radial Basis Function Interpolation". Journal of Computers and Structures 45: 784-795.

A deformation algorithm implementing a radial basis function for carrying out an interpolation on the basis of all the final reference points is preferred among all the algorithms. For each initial reference point, the radial basis function thus determines a final elementary surface. The deformation algorithm can then combine all the final elementary surfaces in order to acquire the surface of the final reference model. The interpolation advantageously allows this surface to be very close to that of the historical model. The ways of combining the final elementary surfaces are known to a person skilled in the art. One way of combining is described, for example, in: http://math.univ-lille1.fr/-calgaro/TER_2019/wa_files/challioui_makki.pdf.

The parameterization of the radial basis function used for an initial reference point is determined on the basis of the information concerning the position of the final reference point. The values of the parameterization are therefore "derived" from the values determining the position of the final reference point.

On the basis of the values of the parameterization of the radial basis function associated with an initial reference point, it is actually possible, for this initial reference point, to parameterize the radial basis function so that, when it is applied to the initial reference point, it results in the corresponding final reference point.

The same parameters are preferably assessed for all the initial reference points.

The deformation algorithms listed above are not limiting. In particular, Control Mesh Methods are also known, which include the Delaunay Graph Method, the RBFs-MSA (Moving Submesh Approach) hybrid method, and the Quaternion Based Method.

In step 4), a historical characteristic vector is determined containing, ordered according to a predetermined order, at least some, or even all the values determined in step 3.

The values of the historical characteristic vector are selected so that the final reference model can be reconstructed on the basis of the initial reference model.

Preferably, the initial reference points are ordered according to a predetermined order and, in order to form the historical characteristic vector, the values determined in step 3) are ordered according to the predetermined order for the initial reference points.

Advantageously, it is not necessary for the historical characteristic vector to contain information concerning the initial reference points as long as the initial reference model and the order of the initial reference points are known.

Each historical characteristic vector is, without exception, specific to a historical model. The historical characteristic vectors are thus indexes allowing the historical models to be identified. They advantageously represent the shape of the historical models and are fast to compare.

A historical characteristic vector synthesizes and quantifies the deformation of the initial reference model in order to arrive at the final reference model.

In step 5), a record, called "historical record", is formed comprising the historical characteristic vector and the historical model, and is then added to the indexed historical library.

Method for Correcting an Analysis Model

Vectorizing a model on the basis of a limited number of initial reference points allows particularly effective use of this model.

In particular, it is effective for correcting an analysis model.

A model of a tooth to be corrected, called "analysis model", can be processed in order to determine, as the historical characteristic vectors were determined, an "analysis characteristic vector". The analysis characteristic vector then can be compared with the historical characteristic vectors. This comparison allows a historical characteristic vector to be determined that is optimally matched with the analysis characteristic vector, and thus allows an "optimal" historical model to be found, i.e., that is optimally matched with said analysis model. Such a comparison of characteristic vectors is advantageously much faster than comparing the analysis model with the historical models themselves.

The optimal historical model advantageously can be used to correct, or even replace, the analysis model, for example, within a dental arch model.

The invention particularly relates to a method for correcting a model of an "analysis" tooth, called "analysis model", comprising a mesh of points, called "analysis points", defining an "analysis" surface, said method comprising the following steps:

A) before step E), generating an indexed historical library according to a generation method according to the invention;

B) placing the analysis model in a standardized configuration with respect to the initial reference model; then C) for each initial reference point, determining a final reference point by means of a deformation algorithm identical to that implemented when generating the historical library, then determining a set of values determining the position of the final reference point, for example, a parameter of the movement vector, the origin of which is the initial reference point and the end of which is the respective final reference point, and/or determining a final elementary surface depending on the final reference point, the deformation algorithm determining the positions of the final reference points so that the final reference model consisting of a mesh of the final reference points matches the analysis model as closely as possible;

the final reference points preferably being determined so that they can result from a constraint deformation of the initial reference model, or being computed, preferably by projecting the initial reference points onto the analysis surface;

D) generating a characteristic vector, called "analysis characteristic vector", grouping, according to the order adopted for the historical characteristic vectors, the values determined in step C);

E) searching, in the indexed historical library, for a historical record comprising a historical characteristic vector matching the analysis characteristic vector as closely as possible and correcting the analysis model with the historical model of said historical record, with the correction being able to involve replacing the analysis model with the historical model.

Steps B), C) and D) are similar to steps 2), 3) and 4), respectively, but apply to an analysis model and not to historical models.

In step E), comparing the analysis characteristic vector with the various historical characteristic vectors allows the historical characteristic vector to be determined that is closest to the analysis characteristic vector, and thus, indirectly, allows the historical model to be determined that is closest to the analysis model. The historical characteristic vectors and the analysis characteristic vector advantageously include a limited number of values, since they only relate to the movements of the initial reference points, in a limited number. Therefore, browsing the indexed historical library advantageously is very fast.

Preferably, the indexed historical library only comprises historical models modelling teeth with the same number or of the same type as the tooth modeled by the analysis model. Preferably, the initial reference model also models a tooth with the same number or is of the same type.

The analysis model corrected according to a correction method according to the invention particularly can be used to construct a model of the dental arch of an individual with said tooth and/or to fill a white area of the analysis model and/or to remove any errors from the analysis model, and/or to replace part of the analysis model representing an intraoral organ with a surface of said historical model and/or to replace the analysis model with said historical model.

Steps A) to E) will now be described in detail.

In the example described in detail, an analysis model is a tooth model intended to be analyzed, for example, for the correction thereof. Like the historical models, it is made up of a mesh of points, called "analysis points". It may have been generated according to any known technique, preferably with a 3D scanner. It may have been prepared on the basis of measurements taken on the tooth of an individual or on a mold of this tooth, for example, a plaster cast. It may also result from cutting a model of the dental arch of the individual into tooth models.

Typically, an analysis model comprises more than 1,000, preferably more than 5,000, preferably more than 10,000 analysis points, and/or less than 1,000,000, or even less than 500,000, or even less than 100,000, or even less than 50,000 analysis points.

In step A), an indexed historical library is generated as described above.

Step A) can be carried out at any time before the search of step E).

In step B), the initial reference model and the analysis model are placed in the standardized configuration, i.e., by following the configuration rules used in step 2). This step is similar to that carried out on the historical models in step 2).

In step C), a final reference model is determined, with the deformation algorithm, for each initial reference point and on the basis of the initial reference model and the analysis model, which final reference model assumes a shape as close as possible to that of the analysis model.

The deformation algorithm is that used in step 2) for the historical models.

In one embodiment, a constraint deformation of the initial reference model is carried out in order to define the final reference model, preferably with an optimization method. The aim then involves minimizing the cumulative distance between the final reference points and the "analysis" surface of the analysis model. The set of final reference points thus corresponds to the analysis model as closely as possible. The deformation algorithm can implement any optimization method, preferably with a metaheuristic method, preferably by simulated annealing, in particular the methods listed above. Computing the constraint deformation of the initial reference model advantageously is fast.

In particular, in the case whereby the final reference points are determined by a constraint deformation of the initial reference model, a set of values determining the position of the final reference point preferably comprises the value of a parameter of the movement vector, the origin of which is the initial reference point and the end of which is the respective final reference point. Preferably, a value is determined for several parameters of the movement vector, for example, the distance, along each of the three axes of a coordinate system, for example, an orthonormal coordinate system, between an initial reference point and the corresponding final reference point.

Preferably, the deformation algorithm computes the position of the final reference points by projecting the initial reference points onto the surface of the analysis model, then, more preferably, uses, in a manner per se known, a radial basis function so as to acquire a final reference model that assumes a shape that is as close as possible to that of the analysis model.

Then, for each initial reference point, a set is determined comprising values determining the position of the corresponding final reference point and/or determining a final elementary surface depending on the final reference point.

In particular, in the case whereby a radial basis function is applied for an initial reference point, said set preferably comprises the values of the parameterization of the radial basis function.

The parameters corresponding to the values of said set are identical to those used in step 3) for the historical models, so that the analysis characteristic vector is comparable to the historical characteristic vectors.

The same parameters are preferably assessed for all the initial reference points.

In step D), an analysis characteristic vector grouping values determined in step C) is determined for all the initial reference points.

The values determined in step C) are ordered according to an order identical to that used in step 4) in order to construct the historical characteristic vectors.

An analysis characteristic vector is thus acquired.

The analysis characteristic vector synthesizes, and quantifies, the "deformation" of the initial reference model in order to arrive at the final reference model computed in step C) so as to be as similar as possible to the analysis model.

The comparison rules for determining the normalized configuration between the initial reference model and the analysis model, the parameters of the values determined in step C), the parameters of the analysis characteristic vector in step D), and the order of the values within the analysis characteristic vector are identical to the comparison rules for determining the normalized configuration between the initial reference model and the historical models, to the parameters of the values determined in step 3), to the parameters of the historical characteristic vector in step 4), and to the order of the values within the historical characteristic vector. The analysis characteristic vector therefore can be compared with the historical characteristic vectors of the records of the indexed historical library.

In step E), the historical model assuming a shape that is closest to that of the analysis model is sought. The closeness of the shape between the analysis model and a historical model, or a "match", can be quantified by comparing the analysis characteristic vector and the historical characteristic vector of said historical model.

For example, it is possible to assess a function of one, of several or of all the differences between the corresponding values of the analysis characteristic vector and of the historical characteristic vector, for example, the sum of the squares of the differences between the corresponding values of the analysis characteristic vector and of the historical characteristic vector, or, in order to correspond to a Euclidean distance, the square root of this sum.

This function of said differences can be a distance, in particular a Manhattan distance, a Euclidean distance or a Minkowski distance. The inverse of this function can be used to assess said match.

If a historical characteristic vector is $(h_1, h_2, \ldots, h_n)$ and an analysis characteristic vector is $(a_1, a_2, \ldots a_n)$, the match between these vectors could be, for example, the inverse of the Euclidean distance: $1/[(h_1-a_1)^2+(h_2-a_2)^2+ \ldots +((h_n-a_n)^2]^{0.5}$.

In simplified versions, the match between these vectors could be, for example: $1/[(h_1-a_1)^2+(h_2-a_2)^2]^{0.5}$. or even $1/[(h_1-a_1)^2]^{0.5}$.

Comparing the analysis characteristic vector with the various historical characteristic vectors advantageously is very fast and enables reliable identification of the historical record containing the historical model assuming a shape that is closest to that of the analysis model.

The historical model closest to the analysis model, or "optimal" historical model, then can be used to correct the analysis model, for example, in order to fill white areas of the analysis model or to remove any errors from the analysis model or to replace part of the analysis model that does not represent a tooth, for example, because it represents an orthodontic appliance or a part of an orthodontic appliance, for example, an orthodontic bracket.

The correction can even involve replacing the analysis model with the optimal historical model.

In one embodiment, a correction method according to the invention is implemented to successively correct a plurality of tooth models of a dental arch model. A correction method according to the invention is thus particularly useful when the dental arch model must be corrected in less than 5 seconds, 3 seconds or 1 second, particularly when it is used to provide information in real time, for example, via radio waves.

In one embodiment, in step E), the following steps are carried out:

e1) defining a filter relating to one or more parameters, for example, relating to the sole first parameter, of the historical characteristic vectors;

e2) filtering the indexed historical library with said filter so as to retain a subset of the indexed historical library;

e3) modifying the filter, making the filtering conditions stricter, preferably by increasing the number of parameters involved in the filter and/or by enhancing the filtering conditions of said filter;

e4) filtering said subset with the modified filter so as to define a new subset, with the cycle of steps e3) and e4) being repeated until the subset acquired in step e3) comprises less than 5, preferably less than 3, preferably less than 2, historical records;

e5) correcting the analysis model with the historical model of one of said historical records derived from step e4).

This embodiment advantageously allows the correction method to be even faster.

In one embodiment, when the analysis model represents a tooth with a tooth number or a type of tooth, the indexed historical library contains only historical records relating to teeth with the same tooth number or of the same type, respectively. The search for the optimal historical model is advantageously accelerated. Such an indexed historical library particularly can result from filtering, by the tooth number or the type of tooth, a larger indexed historical library comprising historical records relating to teeth with different tooth numbers or different types of teeth.

Notably, in this embodiment, the reference model preferably represents a tooth having the same tooth number or of the same type, respectively.

As is now clearly apparent, the invention allows, on the basis of an analysis model, very fast and efficient browsing of an indexed historical library that can comprise several thousand historical records. It thus allows an "optimal" historical model to be found quickly, typically in less than 5 s, or less than 1 s, which model is comparable to the analysis model, and is therefore likely to provide information concerning the analysis model. Notably, the optimal historical model can provide information allowing the analysis model to be corrected, and in particular to be replaced, for example, in a dental arch model.

A characterization method facilitates searching in the indexed historical library, but also allows other applications:

Three-Dimensional Model Compression

A characteristic vector generated in a step 4) (in particular a historical or analysis vector) forms, with the initial reference model, information that is sufficient for computing a final reference model that is substantially identical to the model "to be characterized" generated in step 1) (historical or analysis model, respectively).

Indeed, each initial reference point of the initial reference model simply needs to be moved in accordance with the values of the parameters of the characteristic vector in order to reconstruct a model close to the model to be characterized. This deformation operation is identical to the deformation operation carried out in step 3), but is no longer carried out to determine the characteristic vector, but, on the basis of the characteristic vector, so as to substantially reconstruct the model to be characterized.

The "reconstructed" database consisting of historical models thus reconstructed is therefore substantially equivalent to the database containing the historical models themselves. However, advantageously, the historical characteristic vectors and the initial reference model that allow the reconstructed database to be generated occupy much less space in the computer memory than the database consisting of the set of historical models.

The database containing the historical models can contain more than 1,000, preferably more than 5,000, more than 10,000 historical models, and/or less than 1,000,000, or even less than 500,000, or even less than 100,000, or even less than 50.000 historical models.

The invention therefore also relates to a method for computerized compression of a database of historical models by generating a database of historical characteristic vectors representing, in a "compressed" manner, the database of historical models, with said method comprising, for each intraoral organ of a set of intraoral organs comprising more than 500 intraoral organs, steps 1) to 4) above, then the following step 5'):

5') adding the historical characteristic vector to a database of historical characteristic vectors.

The intraoral organs are preferably teeth.

The invention also relates to a method for generating a reconstructed, or "decompressed", historical model on the basis of a historical characteristic vector contained in said database of historical characteristic vectors and said initial reference model. According to this method, each point of said reconstructed historical model is generated on the basis of a corresponding initial reference point and of the historical characteristic vector.

In one embodiment, this generation corresponds to a constraint deformation of the initial reference model, with the initial reference points being moved as a function of the historical characteristic vector.

Preferably, the historical characteristic vector comprises at least three values for each initial reference point, with these three values defining a movement vector in space between the initial reference point and the associated final reference point. These three values can define, for example, a three-dimensional movement vector in a cylindrical or spherical Cartesian coordinate system, for example, in an orthonormal coordinate system (x, y, z).

In the embodiment, the historical characteristic vector comprises the parameterization of a projection function. This function is parameterized with this parameterization and is applied to the initial reference points so as to determine the points of the reconstructed historical model.

In a preferred embodiment, the historical characteristic vector comprises, for each initial reference point, the parameterization of an interpolation function, preferably a radial basis function. This function is parameterized with this parameterization and is applied to the initial reference points so as to determine, for each initial reference point, a final elementary surface. The final elementary surfaces are then combined to constitute a final surface defining the surface of the reconstructed historical model.

Biometrics

Each historical characteristic vector is preferably a signature of a historical model, i.e., a unique identifier of the historical model. The historical model can represent a tooth of a "historical" individual. However, the shapes of the teeth of an individual are specific to this individual. The historical characteristic vector corresponding to a tooth of an individual thus constitutes a unique identifier of this individual. It therefore can be used for identifying individuals.

The invention therefore also relates to a method for identifying an individual, said method comprising the following steps:

i) generating, at a first time, according to a generation method according to the invention, an indexed historical library or a database of characteristic vectors, with each characteristic vector resulting from the processing of a historical model of a tooth being associated with an identifier of the individual wearing said tooth;

ii) at a second time after the first time, for example, more than 1 week or more than one month:

1") modelling a target tooth of a target individual to be identified, in the form of a digital three-dimensional model, called "target model", comprising a mesh of points, called "target points", defining a target surface;

2") placing the target model in the normalized configuration with respect to the initial reference model; then 3") for each initial reference point, determining a final reference point by means of a deformation algorithm; then determining a set consisting of values determining the position of the final reference point, for example, a parameter of the movement vector, the origin of which is the initial reference point and the end of which is the respective final reference point, and/or determining a final elementary surface depending on the final reference point, the deformation algorithm determining the positions of the final reference points so that the final reference model consisting of a mesh of the final reference points matches the target model as closely as possible;

4") generating a vector, called "target characteristic vector", grouping, in an ordered manner, the values determined in step 3) for all said initial reference points;

5") searching, in the indexed historical library or in the database of historical characteristic vectors, for a historical characteristic vector matching the target characteristic vector and extracting the identifier associated with said target characteristic vector.

Steps 1") to 4") are identical to steps 1) to 4), respectively, but applied to a target tooth.

Of course, said parameters are the same as those of the historical characteristic vectors of the indexed historical library or of the database of historical characteristic vectors. They are ordered in the same way in the target characteristic vector and in the historical characteristic vectors.

The deformation algorithm is the same in steps 3") and 3).

Advantageously, a target model thus allows the identifier of the target individual to be found very quickly.

The historical characteristic vector corresponding to the target characteristic vector preferably is a historical characteristic vector identical to the target characteristic vector. However, it is possible that, between the first and second times, the shape of the target tooth has evolved. In one embodiment, the historical characteristic vector corresponding to the target characteristic vector is therefore the historical characteristic vector that matches ("best fit") the target characteristic vector as closely as possible.

Detection of Particular Features of a Tooth

Each historical or analysis characteristic vector provides information concerning the difference in shape between a historical or analysis model, and an initial reference model.

When the historical or analysis models and the initial reference model represent teeth of the same type, or with the same number, their shapes are substantially the same. In particular, the initial reference model can represent a population of individuals, for example, grouping people in an age group or that have suffered from the same illness. The initial reference model can be the model of a typodont.

A significant difference in shape between a historical or analysis model and the initial reference model, or, more generally, a significant difference in shape between a historical or analysis model and one or more other models representing teeth of the same type or with the same number can therefore indicate an atypical shape, or "shape anomaly", for example, resulting from a growth defect of a tooth (dwarf tooth), a breakage, a carie or wear of the considered historical or analysis tooth.

The shape anomalies advantageously can be detected by simply examining the historical or analysis characteristic vectors. If one or more values of a historical or analysis characteristic vector are excessive, this means that the initial reference points have been moved abnormally during the deformation of the initial reference model. Comparing these values with ranges of acceptable values thus allows a shape anomaly to be detected quickly, but also allows the zones of the relevant tooth to be identified.

The invention thus relates to a method for detecting a shape anomaly for an intraoral organ "to be tested", preferably a tooth "to be tested", said method comprising an analysis of one or more of the values of a characteristic vector relating to a model of the intraoral organ to be tested. The characteristic vector is established according to a characterization method according to the invention.

The invention particularly relates to a method for detecting a shape anomaly for a tooth "to be tested", said method comprising the following steps:

c) characterizing the tooth to be tested according to steps 1) to 4), so as to acquire a characteristic vector "to be tested";

d) comparing, for at least one parameter of the characteristic vector to be tested, the value of said parameter with a pre-defined range of "acceptable" values;

e) generating, if said value to be tested does not belong to said range, a notification indicating the existence of a shape anomaly, the notification preferably specifying the region of the tooth to be tested affected by the shape anomaly.

In step d), a check is undertaken to determine whether the values of the characteristic vector to be tested are acceptable by checking that they belong to the corresponding "acceptable" ranges.

A range of "acceptable" values for a parameter is a range containing the values of this parameter for which no notification is to be generated. It thus defines a set of values considered to be acceptable. It can be defined by a dental care professional, for example, a dentist or an orthodontist, optionally with the individual wearing the tooth to be tested.

Preferably, it is statistically defined by a computer, before step c), i.e., by analyzing cases of a plurality of teeth. This determination can be carried out by a dental care professional, for example, a dentist or an orthodontist. Preferably, the statistical analysis is carried out by a computer.

In particular, it is possible to proceed as follows:

a) generating, according to the invention, for a plurality of historical teeth, a database of historical characteristic vectors or a database of indexed historical models, and, for at least some of the historical teeth, preferably for each of the historical teeth, determining whether the dental situation is acceptable;

b) determining "acceptable" ranges of values for at least some of the parameters of the historical characteristic vectors of the database of historical characteristic vectors or of the database of indexed historical models, preferably for each of said parameters, with a value being considered to be acceptable if, with respect to step a), the probability of the dental situation associated with said value being acceptable exceeds a probability threshold.

In step a), the plurality of historical teeth preferably comprises more than 1,000, preferably more than 5,000, more than 10,000 historical teeth, and/or less than 1,000,000, or even less than 500,000, or even less than 100,000 or even less than 50,000 historical teeth.

The acceptability of the dental situation is preferably determined by a dental care professional, for example, a dentist or an orthodontist. For example, they may consider the dental situation to be unacceptable if they detect an abnormal shape of the tooth, for example, that the tooth is broken, and that it is acceptable otherwise.

In step b), each range of "acceptable" values relating to a parameter of a historical characteristic vector is delimited by upper and lower limits. It thus defines a set of values considered to be acceptable for this parameter. It can be defined with regard to the values taken for this parameter for the dental situations considered to be acceptable in the previous step.

The probability threshold can be, for example, greater than 70%, 80%, 90% or 95%, preferably substantially 100%. The higher the number of historical teeth, the better the reliability.

For example, it can be seen that, for the fifth parameter, the values for the historical teeth associated with an acceptable situation are more than 95% (probability threshold), ranging between 3 and 7, and that the values for the historical teeth associated with an unacceptable situation are more than 95%, less than 3 or greater than 7. 3 and 7 then can be selected to delimit the range of the acceptable values for the fifth parameter.

Preferably, a region of the tooth is associated with each parameter of the characteristic vector. In particular, the parameters are preferably associated with points of the models of the tooth so that identifying the parameter allows a region of the tooth to be associated therewith. For example, the fifth parameter can provide the value of the movement vector of the third initial reference point along the axis Ox. If the value of this parameter is "unacceptable", it is possible to deduce therefrom that the region affected by the shape anomaly is that of this third point.

In step e), the notification can be used by a computer and/or sent to a person, particularly in the form of a written or oral message. In one embodiment, the notification is sent to the mobile telephone of the individual wearing the tooth to be tested. They can thus arrange an appointment for treatment.

Detection of an Illness or a Risk of Illness

The invention also relates to a method for assessing an attribute on the basis of a three-dimensional representation, called "assessment representation", of an intraoral organ, called "intraoral assessment organ", of an individual, called "assessment individual", said method comprising the following steps:

- creating a learning database comprising more than 1,000, preferably more than 10,000 and/or less than 1,000,000 historical structures, each historical structure comprising:
  - a three-dimensional representation, called "historical representation", of a "historical" intraoral organ of a "historical" individual; and
  - a "historical" descriptor containing a "historical" value, relating to the historical individual, for example, relating to the historical representation, for said attribute;
- training at least one neural network by means of the training database;
- submitting the assessment representation to said neural network so that it determines, for said assessment representation, at least one "assessment" value for said attribute. PCT/EP2019/052127 provides useful information for executing an assessment method according to the invention.

The attribute preferably relates to an illness, in particular to an illness relating to the teeth and/or to the gingiva. Its value can then specify whether the relevant individual (i.e., historical or assessment depending on the considered step) is suffering from a particular illness, or if they have suffered from a particular illness, for example, less than 1 year, less than 6 months or less than 1 month after the representation of the intraoral organ of the relevant individual was carried out.

The attribute can also relate to the intraoral organ of the relevant individual, in particular relating to an orthodontic appliance or to part of an orthodontic appliance worn by the relevant individual. Its value can then specify, for example, if the intraoral organ of the relevant individual is functional or non-functional, for example, out of use, or if it has become non-functional, for example, less than 1 year, less than 6 months or less than 1 month after the representation of the intraoral organ was carried out.

The attribute can particularly relate to:

- a portion, visible or not visible, of the intraoral organ, for example, of the dental arch;
- a position and/or an orientation and/or a calibration of an acquisition appliance used to acquire said relevant representation, for example, of a scanner; and/or
- a property of the relevant representation, and in particular relating to the brightness, to the contrast or to the sharpness of the relevant representation.

It is therefore possible, on the basis of the assessment value, to determine information relating to an illness for the assessment individual and/or relating to the intraoral organ worn by the assessment individual, and then to transmit said information to an operator, with the information indicating, for example, a risk of the occurrence of the illness or a risk of breaking the orthodontic appliance.

Remarkably, an assessment method according to the invention particularly allows detection of the illnesses, or the risks of illnesses, that a human being, and notably an orthodontist, is incapable of detecting. Indeed, learning allows the neural network to associate, with any assessment representation, a value for the attribute without having to establish a causal link, understandable for a human being, between this assessment representation and this value.

The assessment method thus opens a new field of investigation for detecting or preventing illnesses.

In particular, within the scope of an assessment method according to the invention, the intraoral organ can be a tooth, a set of several teeth or, preferably, a dental arch. In order for the training to be effective, the historical intraoral organs are preferably all the same type, and the same nature as the intraoral assessment organ. Preferably, they are all representations of a dental arch.

The neural network particularly can be selected from among:

- specialist networks for classifying images, called "CNN" ("Convolutional Neural Network"), for example:
  - AlexNet (2012);
  - ZF Net (2013);
  - VGG Net (2014);
  - GoogleNet (2015);
  - Microsoft ResNet (2015);
  - Caffe: BAIR Reference CaffeNet, BAIR AlexNet;
  - Torch: VGG_CNN_S, VGG_CNN_M, VGG_CNN_M_2048, VGG_CNN_M_1024, VGG_CNN_M_128, VGG_CNN_F, VGG ILSVRC-2014 16-layer, VGG ILSVRC-2014 19-layer, Network-in-Network (Imagenet & CIFAR-10);
  - Google: Inception (V3, V4);

specialist networks for locating and detecting objects in an image, namely Object Detection Networks, for example:

R-CNN (2013);

SSD (Single Shot MultiBox Detector: Object Detection network), Faster R-CNN (Faster Region-based Convolutional Network method: Object Detection network) Faster R-CNN (2015);

SSD (2015).

The above list is not limiting.

Training the neural network conventionally involves entering the historical representations as input and outputting said corresponding historical descriptors as output. The neural network thus learns to determine a descriptor for a three-dimensional representation, of the same nature as the historical representations, which was entered into the neural network as input.

The assessment representation can be an "analysis representation" within the scope of implementing a method described in international application No. PCT/EP2019/052127 in the name of DENTAL MONITORING.

Characterizing an intraoral organ according to the invention allows a characteristic vector to be acquired that is a simple three-dimensional representation of the intraoral organ. The characteristic vector can indeed include values for defining at least part of the surface of the intraoral organ in three dimensions.

In a preferred embodiment, the historical representations preferably include historical characteristic vectors and the assessment representation preferably is an "assessment" characteristic vector with the same structure as the historical characteristic vectors. The historical and assessment characteristic vectors result from a characterization, according to a characterization method according to the invention, of historical intraoral organs and of the intraoral assessment organ, respectively.

An assessment method according to the invention thus allows very fast training of the neural network with three-dimensional representations representing, in a simple but reliable manner, complex intraoral organs. The implementation of an assessment method according to the invention is considerably accelerated.

Each historical three-dimensional representation can preferably include a set of several historical characteristic vectors, representing the same historical intraoral organ at different times. The assessment representation then preferably comprises a set of "assessment characteristic vectors" with the same structure as said set of historical characteristic vectors. The neural network thus can advantageously take into account not only the shape of the intraoral organ in space, but also the temporal evolution of this shape.

Of course, the invention is not limited to the embodiments described and shown above.

In particular, the intraoral organs, in particular the teeth, are not necessarily those of human beings. A method according to the invention can be used for another animal. The individual can be living or dead; preferably living.

The methods according to the invention can be implemented within the context of an orthodontic treatment, but also outside any orthodontic treatment, and even outside any therapeutic treatment.

The invention claimed is:

1. A method for characterizing an intraoral organ to be characterized, said method comprising the following steps:

1) modelling the intraoral organ to be characterized in the form of a digital three-dimensional model, or "model to be characterized", comprising a mesh of points defining a surface;

2) placing said model to be characterized in a standardized configuration with respect to a digital three-dimensional model, called "initial reference model", comprising a mesh of points, called "initial reference points", the number of initial reference points being less than 20% of the number of points of the model to be characterized; then 3) determining a final reference point, for each initial reference point, by means of a deformation algorithm, then determining a set of values determining the position of the final reference point and/or a final elementary surface depending on the final reference point, the deformation algorithm determining the positions of the final reference points so that a final reference model consisting of a mesh of the final reference points matches the model to be characterized as closely as possible;

4) generating a characteristic vector grouping, in an ordered manner, the values determined in step 3) for all said initial reference points.

2. A method for generating a database of characteristic vectors, said method comprising, for each intraoral organ to be characterized of a set of intraoral organs comprising more than 500 intraoral organs, characterizing said intraoral organ to be characterized according to a method as claimed in claim 1, then according to the following step 5'):

5') adding the characteristic vector to the database of characteristic vectors.

3. A method for generating a model of an intraoral organ, said method comprising generating a characteristic vector according to a method as claimed in claim 1, then, on the basis of the characteristic vector and of said initial reference model, deforming the initial reference model by moving the initial reference points as a function of said characteristic vector.

4. A method for detecting a shape anomaly of an intraoral organ to be tested, said method comprising the following steps:

c) characterizing the intraoral organ to be tested according to a characterization method as claimed in claim 1, so as to acquire a characteristic vector "to be tested";

d) comparing, for at least one parameter of the characteristic vector to be tested, the value of said parameter with a pre-defined range of "acceptable" values;

e) generating, if said value to be tested does not belong to said range, a notification indicating the existence of a shape anomaly.

5. A method for generating a database of indexed historical models, called "indexed historical library", said method comprising, for each intraoral organ of a set of intraoral organs comprising more than 500 intraoral organs:

characterizing according to a method as claimed in claim 1 so as to determine a model of the intraoral organ, or "historical model", and a characteristic vector, called "historical characteristic vector"; then forming a record, called "historical record", comprising said historical characteristic vector and said historical model; then adding said historical record to the indexed historical library.

6. The method as claimed in claim 5, implemented for a plurality of said sets of intraoral organs, said intraoral organs being teeth and each set containing only teeth with the same number or of the same type and the initial reference model used when characterizing the teeth of said set being a model of a reference tooth having said number or being of said type, respectively.

7. The method as claimed in claim 5, wherein said intraoral organs are teeth, said set contains teeth with different numbers or of different types, and the initial reference model used when characterizing the teeth of said set is the same, irrespective of the tooth that is the subject of said characterization.

8. A method for identifying an individual, said method comprising the steps of:

i) generating, at a first time, an indexed historical library according to a method for generating a database of indexed historical models, called "indexed historical library", said method comprising, for each intraoral organ of a set of intraoral organs comprising more than 500 intraoral organs:

characterizing according to a method as claimed in claim 1 so as to determine a model of the intraoral organ, or "historical model", and a characteristic vector, called "historical characteristic vector"; then forming a record, called "historical record", comprising said historical characteristic vector and said historical model; then adding said historical record to the indexed historical library or, a database of characteristic vectors according to a method for generating a database of characteristic vectors, said method comprising, for each intraoral organ to be characterized of a set of intraoral organs comprising more than 500 intraoral organs, characterizing said intraoral organ to be characterized according to a method as claimed in claim 1, then according to the following step 5'):

5') adding the characteristic vector to the database of characteristic vectors; and associating each characteristic vector, the indexed historical library or the database of characteristic vectors, resulting from the processing of a model of an intraoral organ, with an identifier of the individual wearing said intraoral organ, ii) at a second time after the first time:

characterizing a target intraoral organ of a target individual to be identified, according to a method as claimed in claim 1, so as to determine a digital three-dimensional model, or "target model", of the intraoral organ, and a corresponding target characteristic vector; then searching, in the indexed historical library or in the database of characteristic vectors, for a characteristic vector corresponding to the target characteristic vector and having the identifier associated with said characteristic vector corresponding to the target characteristic vector.

9. A method for correcting a digital three-dimensional model, called "analysis model", modelling an intraoral organ, called "intraoral analysis organ", said method comprising the following steps:

generating an indexed historical library according to a method for generating a database of indexed historical models, called "indexed historical library" said method comprising, for each intraoral organ of a set of intraoral organs comprising more than 500 intraoral organs:

characterizing according to a method as claimed in claim 1 so as to determine a model of the intraoral organ, or "historical model", and a characteristic vector, called "historical characteristic vector"; then forming a record, called "historical record", comprising said historical characteristic vector and said historical model; then adding said historical record to the indexed historical library;

characterizing the intraoral analysis organ, according to a method as claimed in claim 1, so as to generate said analysis model and a corresponding characteristic vector, called "analysis characteristic vector";

searching, in the indexed historical library, for a historical record comprising a historical characteristic vector that optimally matches the analysis characteristic vector, and correcting the analysis model with the historical model of said historical record, with the correction being able to involve replacing the analysis model with the historical model.

10. The method as claimed in the claim 9, wherein the method for generating a database of indexed historical models is implemented for a plurality of said sets of intraoral organs, said intraoral organs being teeth and each set containing only teeth with the same number or of the same type and the initial reference model used when characterizing the teeth of said set being a model of a reference tooth having said number or being of said type, respectively, and wherein all the historical models of the indexed historical library, the initial reference model and the analysis model teeth with the same number or of the same type.

11. The method as claimed in claim 9, wherein, for said search, the following steps are carried out:

e1) defining a filter relating to one or more parameters of the historical characteristic vectors;

e2) filtering the indexed historical library with said filter so as to retain a subset of the indexed historical library;

e3) modifying the filter, by making the filtering conditions stricter by increasing the number of parameters involved in the filter and/or by enhancing the filtering conditions of said filter;

e4) filtering said subset with the modified filter so as to define a new subset, with the cycle of steps e3) and e4) being repeated until the subset acquired in step e3) comprises less than 5 historical records;

e5) correcting the analysis model with the historical model of one of said historical records derived from step e4).

12. The method as claimed in claim 9, wherein, after searching the historical model for the historical record, a white area of the analysis model is filled and/or errors in the analysis model are deleted, and/or part of the analysis model representing an intraoral organ is replaced with a surface of said historical model, and/or the analysis model is replaced with said historical model.

13. A method for assessing an attribute on the basis of a three-dimensional representation, called "assessment representation", of an intraoral organ, called "intraoral assessment organ", of an individual, called "assessment individual", said method comprising the following steps:

creating a learning database comprising more than 1,000 historical structures, each historical structure comprising:

a three-dimensional representation, called "historical representation", of a "historical" intraoral organ of a "historical" individual; and a "historical" descriptor containing a "historical" value, relating to the historical individual, for said attribute;

training at least one neural network by means of the training database;

submitting the assessment representation to said neural network so that it determines, for said assessment representation, at least one "assessment" value for said attribute;

the method comprising characterizing, according to a method as claimed in claim 1, historical intraoral organs and the assessment intraoral organ in order to generate, as historical representations and an assessment representation, respectively, historical characteristic vectors and an "assessment characteristic vector", respectively.

14. The method as claimed in claim 1, wherein the deformation algorithm is a constraint deformation algorithm of the mesh of the initial reference model or a projection algorithm of the initial reference points on the surface of the model to be characterized.

15. The method as claimed in claim 1, wherein all said intraoral organs are teeth, or wherein all said intraoral organs are teeth and all the teeth have the same tooth number or are of the same type.

16. The method as claimed in claim 1, wherein the initial reference model is a digital three-dimensional model of a reference intraoral organ and/or represents a population of individuals and/or represents a population of individuals and is a model of a typodont.

17. The method as claimed in claim 1, wherein the number of initial reference points is greater than 10 and/or less than 10% of the number of points of the model to be characterized, or wherein the number of initial reference points is less than 1% of the number of points of the model to be characterized.

18. The method as claimed in claim 1, wherein each characteristic vector comprises more than 10 and less than 1,000 values.

19. The method as claimed in claim 1, wherein the initial reference points are evenly distributed over the surface of the initial reference model.

20. The method as claimed in claim 1, wherein a value determined in step 3) is a value of:

a parameter of the movement vector, the origin of which is the initial reference point and the end of which is the respective final reference point; or a parameter of a function determining said position of the final reference point on the basis of said position of the initial reference point.

21. The method as claimed in claim 1, wherein, in step 4), said characteristic vector comprises parameterizations of an interpolation function determined so that said interpolation function, parameterized with said parameterization, generates a final elementary surface for an initial reference point.

22. The method as claimed in claim 21, wherein said interpolation function is a radial basis function and/or wherein, in step 4), said characteristic vector comprises only values of the parameterization of said interpolation function.

* * * * *